US006612526B2

(12) United States Patent
Meuth et al.

(10) Patent No.: US 6,612,526 B2
(45) Date of Patent: Sep. 2, 2003

(54) HIGH STRENGTH BUOYANT CLAMP ASSEMBLY AND METHOD OF USING SAME

(75) Inventors: Thomas Larry Meuth, Spring, TX (US); Stanley Brannan, Spring, TX (US)

(73) Assignee: Offshore Clamp & Protector Technologies, Inc., Spring, TX (US)

( * ) Notice: Subject to any disclaimer, the term of this patent is extended or adjusted under 35 U.S.C. 154(b) by 0 days.

(21) Appl. No.: 09/766,947

(22) Filed: Jan. 22, 2001

(65) Prior Publication Data

US 2002/0096611 A1 Jul. 25, 2002

(51) Int. Cl.[7] ................................. F16L 3/08
(52) U.S. Cl. ................... 248/74.3; 248/230.8; 403/392; 24/68 R
(58) Field of Search .................. 248/230.8, 230.9, 248/74.3, 230.1, 230.5, 74.1, 74.4, 229.1, 218.4; 24/68 R, 306; 403/392, 389, 385, 396

(56) References Cited

U.S. PATENT DOCUMENTS

| | | | |
|---|---|---|---|
| 1,225,301 A | 5/1917 | Wolfe | 248/230.5 |
| 1,615,092 A | 1/1927 | Longanecker | 24/68 |
| 1,633,129 A | 6/1927 | Snapp | 24/68 |
| 2,169,102 A | 8/1939 | Lemont | 403/385 |
| 2,417,741 A * | 3/1947 | Dillon | |
| 3,705,432 A * | 12/1972 | Wakins, Jr. | |
| 4,059,872 A | 11/1977 | Delasandri | 403/385 |
| 4,200,325 A | 4/1980 | Johnson | 294/74 |
| 4,397,436 A | 8/1983 | Lyon et al. | 248/68 |
| 4,477,207 A * | 10/1984 | Johnson | |
| 4,484,962 A | 11/1984 | Dienes et al. | 156/49 |
| 4,678,147 A | 7/1987 | Barnes et al. | 248/74.1 |
| 4,854,015 A | 8/1989 | Shaull | 24/16 |
| 5,020,749 A | 6/1991 | Kraus | 248/74.3 |
| 5,083,346 A | 1/1992 | Orton | 24/16 |
| 5,136,759 A | 8/1992 | Armour, II | 24/442 |
| 5,542,776 A * | 8/1996 | Reynolds | |
| 5,598,995 A | 2/1997 | Meuth et al. | 248/74.3 |
| 5,904,445 A * | 5/1999 | Meuth | |
| 5,921,517 A | 7/1999 | Meuth et al. | 248/230.8 |

OTHER PUBLICATIONS

Knoff, Koralek and Eareckson, "Prediction of Long Term Strength Retention of Kevlar® Aramid Fibers in Aqueous Environments", undated, 11 pages.
Dupont Data Manual, "Kevlar® for Fiber Optic and Other Cables," Jul. 1991, pp.4–1 to 4–12.

* cited by examiner

*Primary Examiner*—Morie Chan
(74) *Attorney, Agent, or Firm*—Akin Gump Strauss Hauer & Feld LLP (57) ABSTRACT

A buoyant clamp assembly and method for clamping an elongate member to a support member. The buoyant clamp assembly includes a flexible strap having first and second ends. Affixed to the exterior of the flexible strap are wear blocks. A highly frictional layer is attached to the interior of the flexible strap to increase friction between the clamping assembly and the elongate or support member. The flexible strap extends substantially around the elongate and support members. The first and second ends are adapted to be coupled to each other via a loop member. The clamp assembly also includes a tensioner assembly having first and second tensioner bars spaced parallel to one another. Capture bolts affixed to the tensioner assembly prevent the first and second tensioner bars from separating. Each of the first and second tensioner bars includes a bullnose face and the bullnose faces are in opposing relationship to one another. The tensioner assembly also includes adjusting members for adjusting the spacing between the first and second tensioner bars. The first end of the flexible strap extends around the support member, through the gap between the tensioner bars, through the loop member and doubles back on itself through the gap between the tensioner bars. The doubled-back portion of the flexible strap is positioned between the first portion of the flexible strap passing through the gap and the the first tensioner bar 32. A highly frictional layer is attached to the flexible strap in the area where the flexible strap doubles back on itself so that the highly frictional layer is between the flexible strap layers. The holding ability of the clamp assembly is attributable to the tensioner assembly, the doubling back of the flexible strap and the friction multiplier.

26 Claims, 4 Drawing Sheets

HIGH STRENGTH BUOYANT CLAMP ASSEMBLY AND METHOD OF USING SAME

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to clamp assemblies for connecting one member to a support member, and more particularly to a high strength buoyant clamp assembly to attach a pipe or line, such as an umbilical line, to another pipe, and shields the pipe and line from contact with each other and surrounding media. The present invention is particularly adapted for use as a subsea clamp assembly to attach an umbilical line to any type of subsea riser pipe or wireline.

2. Description of the Related Art

The need often arises for a clamp assembly to attach a cable, hose, or pipe to a support member or pipe. Typically, the cable, hose, or pipe is run along the length of the support member or pipe. Many types of clamp assemblies have been used to secure the members to one another. The members may be horizontally positioned or vertically positioned. It is generally desirable that the clamp assembly be capable of quick installation while securely attaching the clamped members to one another. Additionally, it is desirable that the clamp assembly be lightweight and relatively inexpensive.

In the offshore drilling and production industry, it is frequently necessary to run umbilical lines hundreds and even thousands of feet below the support vessel or drilling or production platform down to the sea floor and possibly beyond. Typically, the umbilical lines, which may include electric, MUX (fiber optics), and hydraulics, are required to be attached to a support member, such as a choke or kill line for workover/completion risers, or mud line on a subsea riser system. Due to the high cost of working in such environments, it is critical that the clamp assembly be easy to install, quickly installed, reliable, durable, and dependable to firmly secure the clamped members. Failure of a clamp during drilling can cause unnecessary expense as broken pieces of the clamp assembly may descend into the well, thereby clogging or jamming the lines and other essential equipment during the drilling process. Fishing for broken clamp assembly pieces in a well can be time consuming and result in increased drilling and production delays. Thus, a buoyant clamp assembly would eliminate the likelihood of clamp failure interfering with the drilling process. During the drilling process, the clamp assembly is subjected to significant jarring and contact with the inside of the well casing. Thus, the clamp must be strong enough to withstand constant striking and jolting against the inner casing. In the offshore industry, limited platform space is available for the workman to install the clamp assemblies and sometimes the workman is limited to accessing the riser from a single side. Thus, it is vitally important that the clamp assembly be easy to install from a location on both sides or sometimes one side of the riser.

In the past, riser clamps comprised of two half sections joined about the riser have been used. Typically, these riser clamps were fabricated completely from steel or stainless steel. Such clamps were subject to rust and corrosion and added unwanted weight to the entire clamped assembly causing an increased risk of assembly parts interfering with the drilling process in the event of a failure. Additionally, such clamps tended to be time consuming to install. Another type of riser clamp that has been used is similar to a large hose clamp which screws tight and directly clamps the clamped members to the support member. This type of clamp is subject to damaging the clamped members and is time consuming to install, and does not accommodate size variances of the umbilical(s). Not being able to accommodate size variances can have disastrous consequences if the umbilical hose slips downward and loops inside the marine drill riser or in open water. A MUX line loses its signal transmission if a loop results because of poor clamping. Still other types of prior art clamps have bodies molded of urethane. Typically, a mold relief substance penetrates the skin of the urethane-molded bodies during the molding process and results in the body surface having very low frictional capabilities. It is not desirable to have low frictional capabilities between the clamp body and the riser and/or umbilical members.

Applicant's U.S. Pat. No. 5,598,995 to Meuth discloses a clamp assembly having a receptacle adapted to at least partially receive an elongate member, a pair of flexible support straps connected to the receptacle, and a pair of flexible clamping straps. The pair of flexible support straps are capable of matingly engaging one another around a support member and the pair of flexible clamping straps are capable of matingly engaging one another around one or more elongate members and the support member. The receptacle includes a receptacle body made of high density polyurethane foam having a recess therein adapted to at least partially receive the elongate member. A pivotable buckle is attached to one of the flexible clamping straps for securely tensioning the pair of clamping straps around the elongate member or members and the support member. An adjustment assembly is attached to one of the flexible clamping straps. The adjustment assembly comprises an elastomeric adjuster attached to one of the flexible clamping straps and an adjustment patch attached to the elastomeric adjuster. The adjustment patch is capable of matingly engaging one of the flexible clamping straps. The pairs of flexible support straps and flexible clamping straps engage with hook and loop type fasteners.

Applicant's U.S. Pat. No. 5,921,517 to Meuth discloses a clamp assembly for clamping an elongate member to a support member. The clamp assembly includes a flexible strap having first and second ends. The flexible strap extends substantially around the elongate and support members. The first and second ends are adapted to be coupled to each other or to the support member. The clamp assembly also includes a tensioner assembly having first and second tensioner bars spaced parallel to one another. Each of the first and second tensioner bars includes a bullnose face and the bullnose faces are in opposing relationship to one another. The tensioner assembly also includes an adjusting member for adjusting the spacing between the first and second tensioner bars. The flexible strap extends twice through the space between the first and second tensioner bars.

It is desirable to have a high strength clamp assembly that is lightweight and buoyant, easy to install, capable of being quickly installed, and able to withstand jarring contact with the inner well casing and protect the lines or pipes. It is also desirable that the high strength buoyant clamp assembly be economical and durable, in addition to firmly securing an elongate member to a support member. The clamp assembly should also provide protection against abrasion at the contact points with the clamped members.

BRIEF SUMMARY OF THE INVENTION

The present invention is a high strength buoyant clamp assembly and method utilizing a flexible strap and a friction multiplier material to securely clamp an elongate member to a support member. The high strength clamp assembly is lightweight and buoyant, easy to install, capable of quick installation, and exceptionally durable by design to protect the lines or pipes from contact with each other and an inner well casing. The high strength clamp assembly is economical and firmly secures the clamped members to one another, and accommodates all variances of size for both the umbilical(s) and riser pipe(s) being clamped together.

The high strength buoyant clamp assembly includes a flexible strap having first and second ends. The flexible strap extends substantially around the elongate and support members. Affixed to the first end of the flexible strap is a pull tab which is adapted to be passed through an elongate loop affixed to the second end of the flexible strap. The flexible strap is secured by a tensioner assembly. Affixed to the exterior of the flexible strap are spaced buoyant wear blocks. Stitched to the interior of the flexible strap is a friction multiplier to improve the gripping of the elongate and support members. The tensioner assembly includes first and second tensioner bars spaced parallel to one another and attached to each other by buoyant capture bars. Each of the first and second tensioner bars includes a bullnose face and the bullnose faces are in opposing relationship to one another. The tensioner assembly also includes a pair of threaded adjusting members for adjusting the spacing between the first and second tensioner bars. In use, the first and second tensioner bars are situated substantially between the elongate member and the support member.

BRIEF DESCRIPTION OF THE DRAWINGS

In order to more fully understand the drawings referred to in the detailed description of the present invention, a brief description of each drawing is presented, in which.

DETAILED DESCRIPTION OF INVENTION

Figure 1:
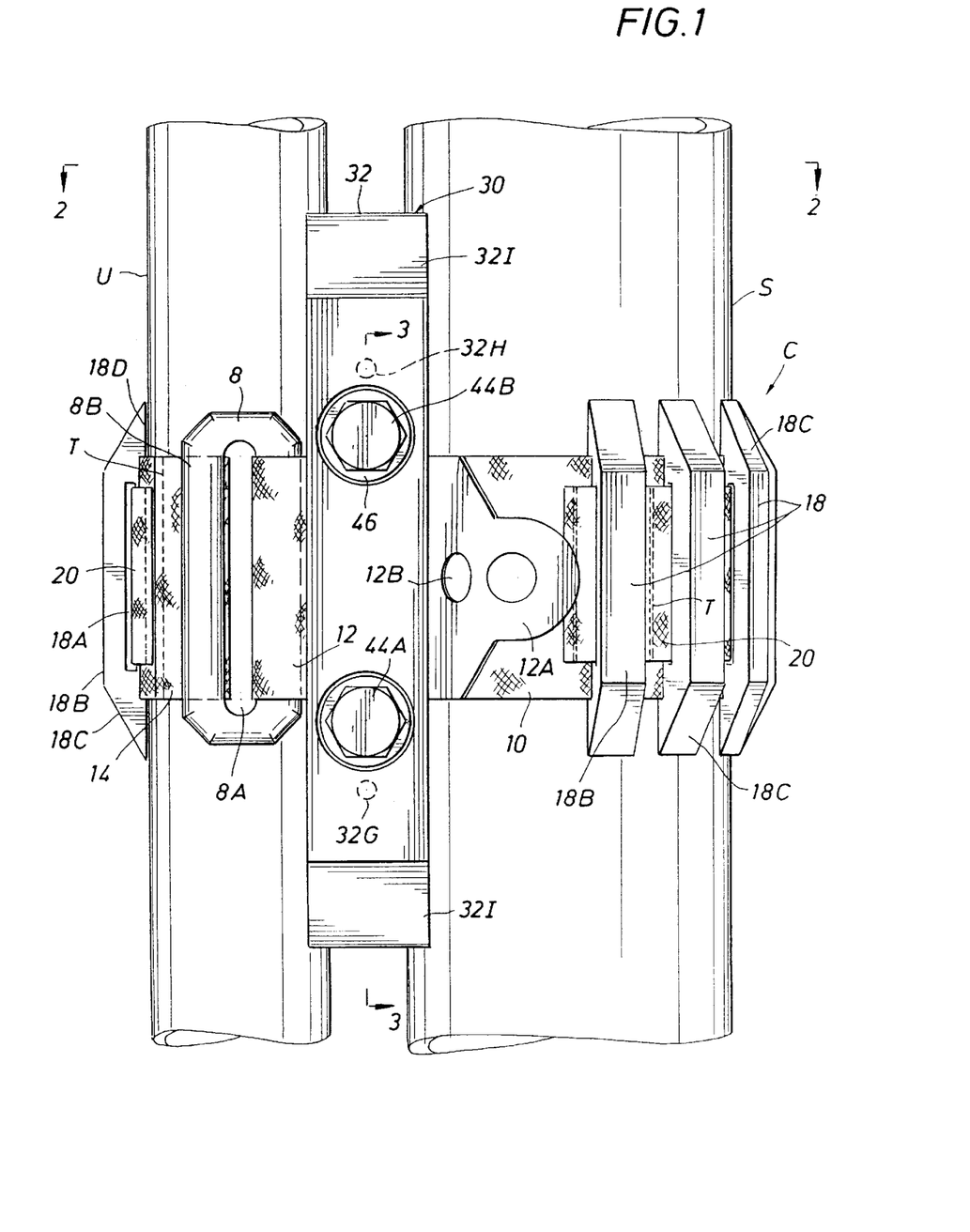
FIG. 1 is a front elevational view of the first embodiment of the high strength buoyant clamp assembly showing an umbilical member clamped to a support member.
Figure 2:
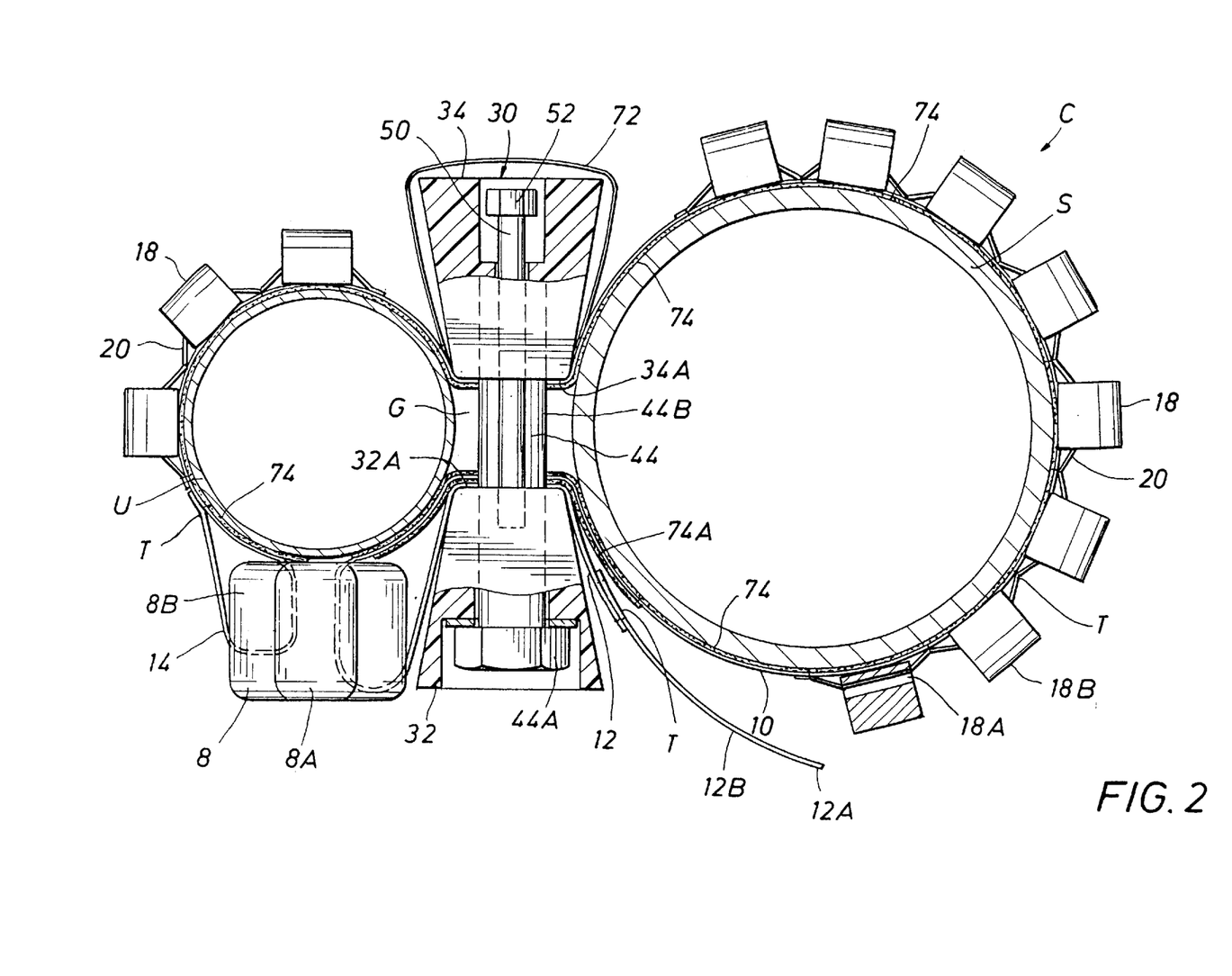
FIG. 2 is a top plan view of the first embodiment of the high strength buoyant clamp assembly of FIG. 1 showing an umbilical member clamped to a support member.
Figure 3:
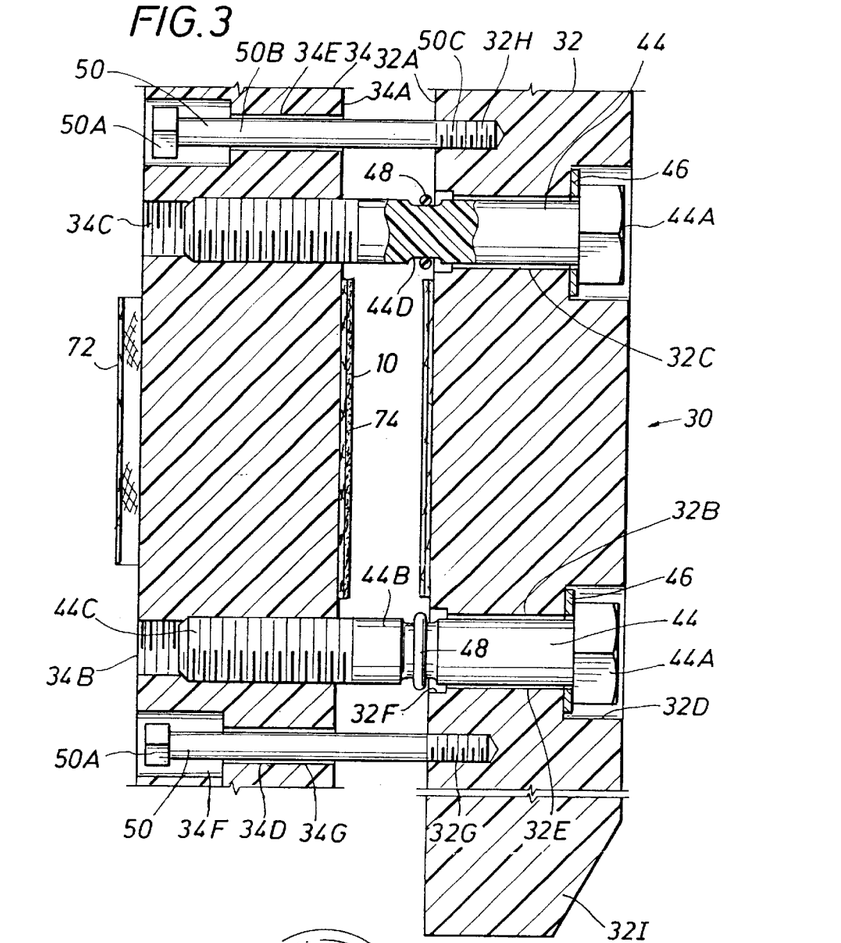
FIG. 3 is a sectional view of the tensioner assembly taken along lines 3—3 of FIG. 1.

Referring now to the drawings in greater detail, the first embodiment of the high strength buoyant clamp assembly of the present invention, generally designated by the letter C, for clamping an umbilical or elongate member U to a support member S is shown in a first embodiment in FIGS. 1–3. The high strength clamp assembly C comprises a strap 10, preferably flexible, having first and second ends 12 and 14, respectively, and a tensioner assembly 30 as shown in FIGS. 1 and 2.

Referring to FIG. 2, the flexible strap 10 has a length sufficient to allow the strap 10 to extend substantially around the elongate and support members U and S, respectively. Preferably, the flexible strap 10 is made from a high strength material such as a polyester webbing material or other like materials, preferably woven materials. One suitable material for the flexible strap 10 is a polyester webbing, which will withstand the harsh environments of a subsea application. Polyester resists hydrolysis in salt water environments, has a high strength-to-weight ratio, combined with low stretch under load, and excellent creep resistance.

The first and second ends 12 and 14, respectively, are adapted to be coupled to an elongate loop 8. The elongate loop 8 is preferably made from ultra-high molecular weight polyethylene (UHMW-PE) because of its superior wear resistance characteristics. UHMW-PE has the best wear resistance characteristics of any of the plastics. Referring to FIG. 1, the second end 14 extends through a loop eye 8A and passes around a vertical loop bar 8B and is then fastened, preferably with stitching T, to another portion of the second end 14 of the flexible strap 10. The second end 14 of the flexible strap 10 is thus secured to the elongate loop 8. The stitching T is preferably a high strength polyester.

Secured by high-strength polyester stitching T to the first end 12 of the flexible strap 10 is a pull-tab 12A to assist in the ease of handling and installation. The pull-tab 12A is preferably made of low density polyethylene (LDPE). As shown in FIG. 1, the pull-tab 12A preferably includes one or more holes 12B to allow fingers to be inserted through during the installation process which will be explained below.

Referring to FIGS. 1–3, mounted to the exterior of the flexible strap 10 are a plurality of wear blocks 18, preferably made of UHMW-PE. The wear blocks 18 are secured by passing restraining webbing 20 through an elongate slot 18A in the wear block 18 and stitching T the restraining webbing 20 to the flexible strap 10. The wear blocks 18 include an outer wear surface 18B which is located outermost when the clamp assembly C is installed. The wear blocks 18 protect the other portions of the clamp assembly C in the installed position. Referring to FIG. 1, preferably the wear blocks 18 include tapered end portions 18C to reduce the possibility of the clamp assembly C hanging up on any upsets within a marine drill riser and also forces the clamp assembly C to centralize itself while passing through the rotary table, spider and marine drill riser. Upsets occur where there is a change in wall thickness of the riser. Preferably, the angle of the tapered end portion 18C at the wear block end is approximately 30° which corresponds to the standard upset angle. Additionally, the tapered end portions 18C have an inner surface extension 18D, extending over the flexible strap width, in close relationship to the members S and U. The extension 18D serves to provide additional attachment support to the flexible strap 10 while bringing the wear block ends even closer to the members S and U.

Referring to FIG. 2, the flexible strap 10 includes a loop of restraining webbing 72 stitched to the flexible strap 10 which secures the flexible strap 10 to a second tensioner bar 34. This eliminates the possibility of the flexible strap 10 becoming separated from the tensioner assembly 30 or vice versa.

Still referring to FIG. 2, stitched to the inner surface of the flexible strap 10 is a friction multiplier 74 for frictionally contacting the elongate and support members U and S, respectively. Preferably, the friction multiplier 74 provides non-abrasive, highly frictional contact with the elongate and support members U and S, respectively, during use of the clamp assembly C and prevents slippage of either member from the clamp assembly C. One suitable friction multiplier 74 is a 3M product sold under the trademark SCOTCH BRITE. The SCOTCH BRITE product is a pad having ceramic powders embedded in the polyester matrix of the pad. It is to be understood that various other materials may be used for the friction multiplier 74 as for example abrasive materials, sandpaper, or scouring pads to name but a few.

Preferably, a friction multiplier 74A is also stitched to the outer surface of the flexible strap 10 at the location where the first end 12 of the flexible strap 10 is passed back through the tensioner assembly 30 as will be explained below. It is to be understood that the friction multiplier 74A is made from the same material as the friction multiplier 74.

The tensioner assembly 30 includes a first tensioner bar 32 and a second tensioner bar 34 as shown in FIGS. 2 and 3. The tensioner bars 32 and 34 are preferably made from polypropylene due to the buoyancy of polypropylene. The first and second tensioner bars 32 and 34, respectively, are elongate members. Each of the tensioner bars 32 and 34 include a bullnose face 32A and 34A, respectively, as shown in FIG. 2. The bullnose faces 32A and 34A are in opposing relationship to one another. Preferably, each of the tensioner bars 32 and 34 have extending end portions 32I (FIGS. 1 and 3) to provide additional buoyancy for the clamp assembly C, if necessary. It is to be understood that, while not shown in the drawings, the tensioner bar 34 would also preferably include extending end portions.

The tensioner assembly 30 includes a pair of adjusting members 44 for altering the horizontal separation between the tensioner bars 32 and 34. Preferably, the first tensioner bar 32 has adjusting member lower and upper bores 32B and 32C, respectively. Adjusting member bores 32B and 32C have varying diameters. Referring to FIG. 3, each of the adjusting member bores 32B and 32C includes an enlarged countersunk portion 32D, a shaft bore portion 32E, and an O-ring recess portion 32F. It is to be understood that the upper bore 32C and the lower bore 32B are similar in all respects. The second tensioner bar 34 also has two adjusting member bores 34B and 34C, preferably threaded, that directly oppose bores 32B and 32C in the first tensioner bar 32.

Referring to FIG. 3, the adjusting members 44 include a drive portion or head 44A, a shank 44B, and a threaded portion 44C. The shank 44B preferably includes a groove 44D for an O-ring 48 to capture the bolt or adjusting member 44. Still referring to FIG. 3, the adjusting member shanks 44B are inserted through the adjusting member bores 32B and 32C of the first tensioner bar 32. Preferably, a flat washer 46 is positioned in the countersunk portion 32D prior to insertion of the adjusting member 44. The flat washer is preferably non-metallic, and more preferably a polycarbonate plastic or other plastic material. The O-ring 48 is secured in place by the groove 44D in the adjusting members 44. The adjusting members 44 are threadedly received in the adjusting member bores 34B and 34C of the second tensioner bar 34. The first and second adjusting members 44 serve to adjust the spacing between the tensioner bars 32 and 34. Preferably, the adjusting members 44 are made from Isoplast-101, LGF-40 which is a material available from Dow Chemical.

As shown in FIG. 3, the O-ring 48 has an outside diameter greater than the diameter of the shaft 44B but less than the diameter of the O-ring recess portion 32F. The O-ring 48 is intended to prevent dislocation of the adjusting member 44 from the first tensioner bar 32. Further, in the event of the adjusting member 44 shearing or failing at or near the second tensioner bar 34, the O-ring 48 will maintain the drive portion 44A of the adjusting member 44 with the first tensioner bar 32. It is to be understood that the adjusting member 44 is designed to break or fail in the threaded portion 44C, thereby maintaining the shank 44B and O-ring 48 intact and preventing the loss of the shank 44B and head 44A.

The tensioner assembly 30 also includes a pair of capture bolts 50 for maintaining a connection between the first and second tensioner bars 32 and 34 in the event of failure or the unthreading of the adjusting members 44 from the second tensioner bar 34. The capture bolts 50 are preferably made from high density polyethylene (HDPE). Preferably, the second tensioner bar 34 has capture bolt lower and upper bores 34D and 34E, respectively. Capture bolt bores 34D and 34E have varying diameters. Referring to FIG. 3, each of the capture bolt bores 34D and 34E includes an enlarged countersunk portion 34F and a shaft bore portion 34G. It is to be understood that the upper bore 34E and the lower bore 34D are similar in all respects. The first tensioner bar 32 also has two capture bolt bores 32G and 32H, preferably threaded, that directly oppose bores 34D and 34E in the second tensioner bar 34.

Referring to FIG. 3, the capture bolts 50 include a drive portion or head 50A and a shaft 50B having a threaded portion 50C. The capture bolt shafts 50B are inserted through the capture bolt bores 34D and 34E of the second tensioner bar 34. The capture bolts 50 are threadedly received in the capture bolt bores 32G and 32H of the first tensioner bar 32. Referring to FIG. 3, it is to be understood that the capture bolt heads 50A serve to limit the outward movement of the second tensioner bar 34 relative to the first tensioner bar 32. The capture bolts 50 prevent the dislocation or entire separation of the tensioner bars 32 and 34.

The installation of the first embodiment of the clamp assembly C will now be described in detail with reference to FIGS. 1–3. Initially, the adjusting members 44 are generally retracted or unthreaded from the second tensioner bar 34 to allow increased spacing between the first and second tensioner bars 32 and 34, respectively. The O-rings 48 captured in the recess portion 32F prevent the removal of the adjusting members 44 from the first tensioner bar 32. The capture bolts 50 prevent the disengagement of the second tensioner bar 34 from the first tensioner bar 32. The flexible strap first end 12 and the second end 14 with the loop 8 extend freely from the second tensioner bar 34. The first end 12 of the flexible strap 10 and pull-tab 12A is passed substantially around support member S and extended through the gap G (FIG. 2) between the tensioner bars 32 and 34. The second end 14 with the loop 8 is passed substantially around the umbilical member U. The first end 12 of the flexible strap 10 is then joined to the second end 14 by feeding the pull-tab 12A through the loop eye 8A of the elongate loop 8. The pull-tab 12A is then fed back through the space or gap G between the tensioner bars 32 and 34 as shown in FIG. 2. The first end 12 of the flexible strap 10 doubles back on itself. The doubled-back portion of the flexible strap 10 is positioned between the first portion of the flexible strap 10 passing through the gap G and the first tensioner bar 32. Preferably, the pull-tab 12A is pulled to snug the flexible strap 10 around the umbilical and support members U and S. It is to be understood that the friction multiplier 74 is in contact with the umbilical and support members U and S and the friction multiplier 74A is in contact with the flexible strap first end 12 in the area where the flexible strap 10 doubles back on itself.

The adjusting members 44 are rotated to threadedly drive the tensioner bars 32 and 34 toward each other, thus reducing the gap G. As is apparent from FIG. 2, the continued advancement of the tensioner bars 32 and 34 toward each other eliminates the slack in the flexible strap 10 extending substantially around the umbilical and support members U and S. Preferably, the flexible strap 10 contacts the bullnose faces 32A and 34A of the tensioner bars 32 and 34, respectively. The adjusting members 44 are advanced until the tension in the flexible strap 10 provides a suitable clamping force exerted on the assembly to ensure that the umbilical member U remains firmly clamped or secured to the support member S. It is to be understood that the friction-multiplier 74 may form impressions in the outer surface, of the umbilical material and/or the coating of the support member. For example, the SCOTCH BRITE friction multiplier 74 which has ceramic powders embedded in the matrix will form impressions in the outer surface of the umbilical material and/or in the paint on the support member. The force of the flexible strap against the friction multiplier creates tremendous frictional forces which prevents any slippage of the strap assembly. The holding ability of the clamp assembly C is attributable to the tensioner assembly 30, the doubling back of the flexible strap 10 and the friction multiplier 74 and 74A.

Figure 4:
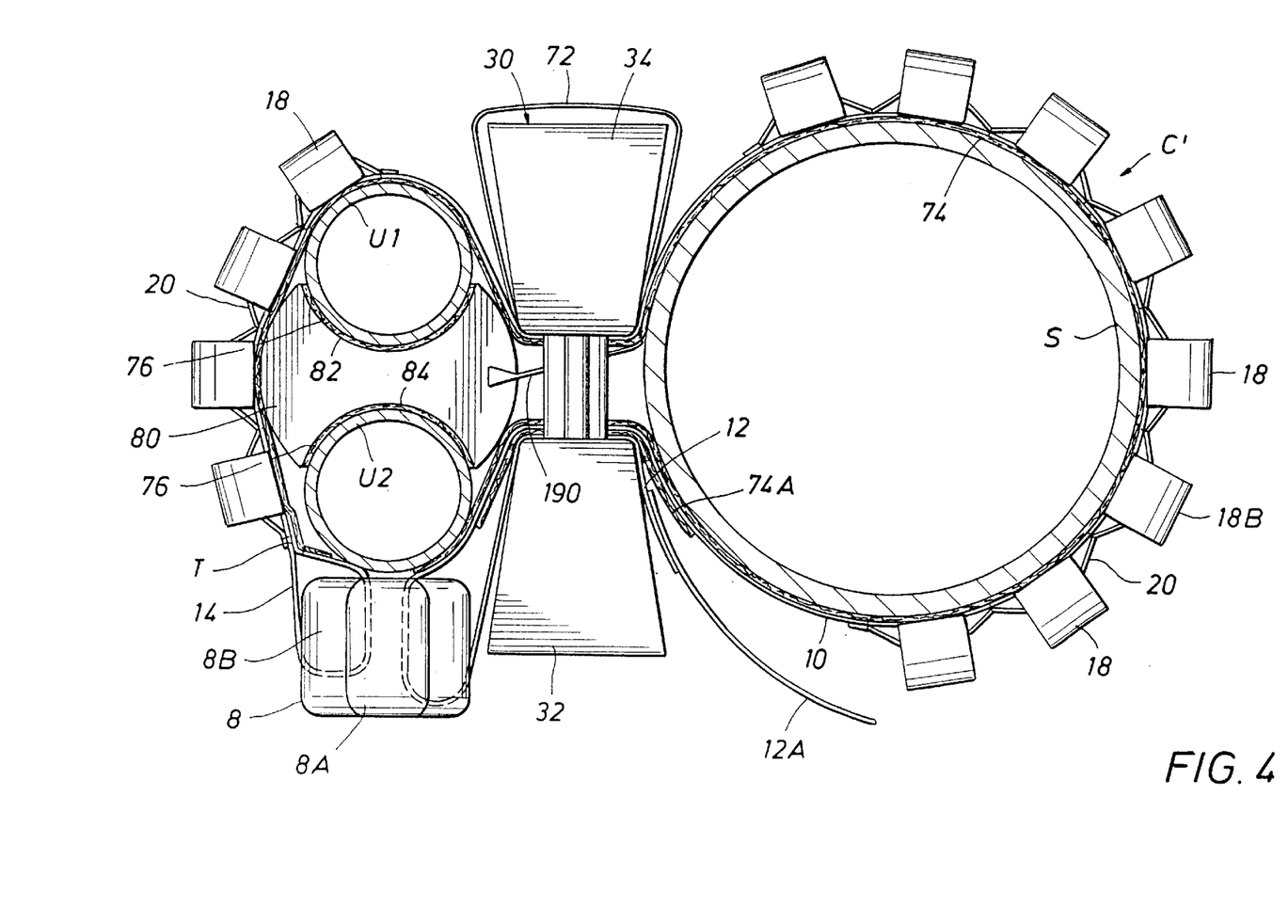
FIG. 4 is a top plan view of a second embodiment of the high strength buoyant clamp assembly showing two umbilical members received in a preformed receiving block and clamped to a support member.
Figure 5:
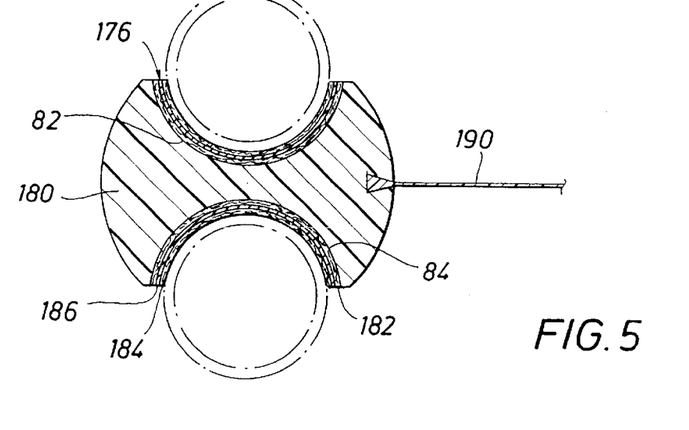
FIG. 5 is a top plan view of an alternative embodiment of the preformed receiving block of the second embodiment of the high strength buoyant clamp assembly.

FIG. 4 illustrates a second embodiment of the high strength buoyant clamp assembly, generally designated as C', and FIG. 5 shows a variation of a component of the clamp assembly C'. It is to be understood that many of the components of the clamp assembly C are also used in the clamp assembly C'. Thus, the same two digit reference numeral is used if the component is the same or substantially the same in the various embodiments. It is to be understood that the components are the same in the various embodiments unless the component is given a different reference numeral and further described below.

The high strength clamp assembly C' comprises a strap 10, preferably flexible, having first and second ends 12 and 14, respectively, and a tensioner assembly 30 as described above. Referring to FIG. 4, the flexible strap 10 has a length sufficient to allow the strap 10 to extend substantially around the elongate members U1 and U2 and the support member S. Preferably, the flexible strap 10 is made from a high strength polyester webbing material. The first and second ends 12 and 14, respectively, are adapted to be coupled to an elongate loop 8. The elongate loop 8 is preferably made from ultra-high molecular weight polyethylene (UHMW-PE). Referring to FIG. 4, the second end 14 extends through a loop eye 8A and passes around a vertical loop bar 8B and is then fastened, preferably with stitching T, to another portion of the second end 14 of the flexible strap 10. The second end 14 of the flexible strap 10 is thus secured to the elongate loop 8. The stitching T is preferably with high strength polyester.

Secured by high-strength polyester stitching T to the first end 12 of the flexible strap 10 is a pull-tab 12A, as described above, to assist in the ease of handling and installation. The pull-tab 12A is preferably made of low density polyethylene (LDPE).

Referring to FIG. 4, mounted to the exterior of the flexible strap 10 are a plurality of wear blocks 18, preferably made of UHMW-PE. The wear blocks 18 are secured with webbing 20 as described above. The wear blocks 18 include an outer wear surface 18B which is located outermost when the clamp assembly C' is installed. The wear blocks 18 protect the other portions of the clamp assembly C' in the installed position.

Still referring to FIG. 4, the flexible strap 10 includes a loop of restraining webbing 72 stitched to the flexible strap 10 which secures the flexible strap 10 to a second tensioner bar 34. This eliminates the possibility of the flexible strap 10 becoming separated from the tensioner assembly 30 or vice versa.

As shown in FIG. 4, stitched to the inner surface of the flexible strap 10 is a friction multiplier 74 for frictionally contacting the elongate members U1 and U2 and support member S. Preferably, the friction multiplier 74, as described above, provides highly frictional contact with the members U1, U2 and S, during use of the clamp assembly C' and prevents slippage of either member from the clamp assembly C'. Preferably, a friction multiplier 74A is also stitched to the outer surface of the flexible strap 10 at the location where the first end 12 of the flexible strap 10 is passed back through the tensioner assembly 30 as will be explained below. It is to be understood that the friction multiplier 74A is made from the same material as the friction multiplier 74.

The tensioner assembly 30 is the same as described above and includes a first tensioner bar 32 and a second tensioner bar 34 as shown in FIG. 4. It is to be understood that all of the other features of the tensioner assembly 30 are same as in the first embodiment.

The second embodiment of the clamp assembly C' includes a preformed receiving block 80 as shown in FIG. 4. The receiving block 80 is preferably made from polypropylene. An alternative receiving block 180 is shown in FIG. 5 and is preferably made from urethane, more preferably a two part urethane. It may be desirable to include glass balls (not shown) within the receiving block 180 for purposes of flotation. Although not shown, it is to be understood that the receiving block 80, 180 preferably has a length approximating the width of the flexible strap 10. The receiving block 80, 180 includes two or more receptacles 82 and 84 conformed to at least partially receive the corresponding elongate members U1 and U2. It is to be understood that the receptacles 82 and 84 may be different sizes depending upon the corresponding elongate members U1 and U2. Preferably, the receptacles 82 and 84 are arcuate-shaped along the length of the receiving block 80, 180.

The receiving block 80 includes a friction multiplier 76 attached to the receptacles 82 and 84. Preferably, the friction multiplier 76 is made of the same material as the friction multiplier 74. Preferably, the friction multiplier 76 is adhered to the receptacles 82 and 84 of the receiving block 80 with a thin layer of epoxy.

Referring to FIG. 5, the receiving block 180 includes a friction multiplier 176 attached to the receptacles 82 and 84. The friction multiplier 176 comprises a composite of first and second friction multiplier layers 182, 184 "sandwiched" around an inner barrier layer 186. The barrier layer 186, preferably made of rubber, has the first and second friction multiplier layers 182, 184 attached to the barrier layer 186, preferably by stitching. Preferably, the friction multiplier layers 182, 184 are made of the same material as the friction multiplier 74. Preferably, the friction multiplier 176 is positioned into the proper shape, preferably within a mold, and the urethane is poured into a mold to form the receiving block 180. During the molding process, the urethane saturates the first friction multiplier layer 182 to form a secure bond with the friction multiplier 176. The barrier layer 186 prevents the urethane from saturating the second friction multiplier layer 184.

Referring to FIGS. 4 and 5, the receiving block 80, 180 is preferably secured to the clamp assembly C' for ease of installation of the plurality of members U1, U2 and S to the clamp assembly C'. There are various ways of securing the receiving block 80, 180 to the clamp assembly C'. Preferably, the receiving block 80, 180 is secured to the flexible strap 10 with an attachment band 190 as shown in FIG. 4. The attachment band 190 is attached at one end to the receiving block 80, 180 and at a second end to the flexible strap 10 near the tensioner bar 34. The attachment band 190 is preferably made from a low density polyethylene and preferably secured by stitching to the flexible strap 10. Alternatively, screws, preferably stainless steel screws or other like devices, could be used to secure the attachment band 190 to the receiving block 80, 180.

The preformed receiving block 180 provides the ability to firmly secure two or more umbilicals or elongated members U1 and U2 to the support member S. It is to be understood that the installation of the clamp assembly C' is similar to the installation of the clamp assembly C described above, however, the elongated members U1 and U2 are received in the receptacles 82 and 84 prior to the second end 14 of the flexible strap 10 being joined to the first end 12 by inserting the pull-tab 12A through the loop 8. All other steps of installation and use are similar in all respects to the installation and use of the clamp assembly C.

It is to be understood that the high strength buoyant clamp assembly of the present invention is very versatile and has applications in many fields. It is not intended to be limited to the drilling industry, but could be used in virtually any situation requiring the clamping of an elongate member to a support member.

It is to be understood that each of the clamp assemblies C and C' is a high strength buoyant clamp assembly utilizing a flexible strap and friction multiplier to securely clamp an elongate member to a support member. The high strength clamp assembly C, C' is lightweight and buoyant, easy to install, capable of quick installation, and exceptionally durable by design to protect the lines or pipes from contact with each other and the inner well casing. The high strength clamp assembly C, C' is economical and firmly secures the clamped members to one another. Further, it is to be understood that the clamp assembly C, C' may be made entirely from non-metallic components while providing a clamping force meeting or exceeding many metallic clamps, at a much reduced weight. The components from which the clamp assembly C, C' are made are either buoyant or else will not result in serious problems downhole if somehow they fail and fall to the bottom of the hole. As stated above, the clamp assembly C, C' is buoyant as an entire assembly, and is designed to hold all assembly parts captive.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A buoyant clamp assembly for clamping an elongate member to a support member, the clamp assembly comprising:

a non-rigid, flexible strap having a first end and a second end, said flexible strap for extending substantially around the elongate and support members, said first and second ends adapted to be coupled to each other; and a tensioner assembly comprising:
first and second tensioner bars spaced substantially parallel to one another; and
an adjusting member for adjusting the spacing between said first and second tensioner bars; and said flexible strap attached to said tensioner assembly, wherein the combination of said flexible strap and said tensioner assembly is buoyant in seawater.

2. The clamp assembly of claim 1, wherein affixed to said flexible strap is a highly frictional layer for increasing friction and preventing slippage between said flexible strap and the elongate and support members.

3. The clamp assembly of claim 2, wherein said highly frictional layer is a pad having ceramic powders embedded in the matrix of said pad.

4. The clamp assembly of claim 1, further comprising a plurality of buoyant wear blocks affixed to said flexible strap.

5. The clamp assembly of claim 1, wherein said first and second tensioner bars are buoyant.

6. The clamp assembly of claim 1, further comprising a capture bolt to prevent said first and second tensioner bars from accidental separation.

7. The clamp assembly of claim 1, wherein said adjusting member is a threaded member.

8. A buoyant clamp assembly for clamping an elongate member to a support member, the clamp assembly comprising:

a non-rigid, flexible strap having a first end and a second end, said flexible strap for extending substantially around the elongate and support members, said first and second ends adapted to be coupled to each other;

a highly frictional layer affixed to said flexible strap for increasing friction and preventing slippage between said flexible strap and the elongate and support members; and a tensioner assembly comprising:
first and second tensioner bars spaced substantially parallel to one another; and
an adjusting member for adjusting the spacing between said first and second tensioner bars; and said flexible strap attached to said tensioner assembly and the combination of said flexible strap and said tensioner assembly is buoyant in seawater, wherein said flexible strap includes a first portion which overlaps onto a second portion of said flexible strap, and wherein affixed to said flexible strap is a second highly frictional layer for increasing friction and preventing slippage between said overlapping flexible strap portions.

9. A buoyant clamp assembly for clamping an elongate member to a support member, the clamp assembly comprising:

a non-rigid, flexible strap having a first end and a second end, said flexible strap for extending substantially around the elongate and support members, said first and second ends adapted to be coupled to each other; and a tensioner assembly comprising:
first and second tensioner bars spaced substantially parallel to one another; and
an adjusting member for adjusting the spacing between said first and second tensioner bars; and said flexible strap attached to said tensioner assembly and the combination of said flexible strap and said tensioner assembly is buoyant in seawater; and a buoyant pull-tab attached to said flexible strap.

10. A buoyant clamp assembly for clamping an elongate member to a support member, the clamp assembly comprising:

a non-rigid flexible strap having a first end and a second end, said flexible strap for extending substantially around the elongate and support members; and a tensioner assembly comprising:
first and second tensioner bars spaced substantially parallel to one another; and
an adjusting member for adjusting the spacing between said first and second tensioner bars;

said flexible strap attached to said tensioner assembly and the combination of said flexible strap and said tensioner assembly is buoyant in seawater; and a loop member affixed to said second end of said flexible strap, wherein said first end of said flexible strap is extended through said loop member to secure said flexible strap to the elongate and support members.

11. The clamp assembly of claim 10, wherein said loop member is buoyant.

12. The clamp assembly of claim 10, further comprising a receiving block having two receptacles for receiving two elongate members.

13. The clamp assembly of claim 12, where said receiving block is buoyant.

14. The clamp assembly of claim 12, wherein said receiving block is connected to said flexible strap.

15. The clamp assembly of claim 12, further comprising a friction multiplier layer attached to said receptacles of said receiving block.

16. A clamp assembly for clamping an elongate member to a support member, the clamp assembly comprising:

a non-rigid, flexible strap having a first end and a second end, said flexible strap for extending substantially around the elongate and support members, said first and second ends adapted to be coupled to each other, said flexible strap having a first portion which overlaps onto a second portion of said flexible strap, and wherein affixed to said flexible strap is a highly frictional layer for increasing friction and preventing slippage between said overlapping flexible strap portions; and a tensioner assembly attached to said flexible strap and adapted to tension said flexible strap; and a receiving block having two receptacles for at least partially receiving two elongate members.

17. The clamp assembly of claim 16, wherein said flexible strap and said tensioner assembly are buoyant in seawater.

18. The clamp assembly of claim 16, wherein said receiving block is connected to said flexible strap.

19. The clamp assembly of claim 16, further comprising a friction multiplier layer attached to said receptacles of said receiving block.

20. The clamp assembly of claim 19, wherein said friction multiplier layer is a pad having ceramic powders embedded in the matrix of said pad.

21. The clamp assembly of claim 16, wherein said highly frictional layer affixed to said flexible strap also increases friction and prevents slippage between said flexible strap and the elongate and support members.

22. A clamp assembly for clamping an elongate member to a support member, the clamp assembly comprising:

a non-rigid, flexible strap made of a woven material having a first end and a second end, said flexible strap for extending substantially around the elongate and support members, said first and second ends adapted to be coupled to each other, said flexible strap having a highly frictional layer for increasing friction and preventing slippage between said flexible strap and the elongate and support members;

a tensioner assembly attached to said flexible strap and adapted to tension said flexible strap, wherein said flexible strap and said tensioner assembly are buoyant in seawater; and a plurality of buoyant wear blocks affixed to said flexible strap.

23. The clamp assembly of claim 22, further comprising a receiving block having two receptacles for at least partially receiving two elongate members.

24. The clamp assembly of claim 23, wherein said receiving block is connected to said flexible strap.

25. The clamp assembly of claim 23, further comprising a friction multiplier layer attached to said receptacles of said receiving block.

26. The clamp assembly of claim 25, wherein said friction multiplier layer is a pad having ceramic powders embedded in the matrix of said pad.

* * * * *